(12) United States Patent
Kim et al.

(10) Patent No.: US 9,482,689 B2
(45) Date of Patent: Nov. 1, 2016

(54) ACCELEROMETER

(71) Applicants: Joonwon Kim, Gyeongsangbuk-do (KR); Usung Park, Gyeongsangbuk-do (KR); Jinseung Lee, Daejeon (KR)

(72) Inventors: Joonwon Kim, Gyeongsangbuk-do (KR); Usung Park, Gyeongsangbuk-do (KR); Jinseung Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 284 days.

(21) Appl. No.: 14/348,708

(22) PCT Filed: Sep. 26, 2012

(86) PCT No.: PCT/KR2012/007746
§ 371 (c)(1),
(2) Date: Mar. 31, 2014

(87) PCT Pub. No.: WO2013/048106
PCT Pub. Date: Apr. 4, 2013

(65) Prior Publication Data
US 2014/0238130 A1    Aug. 28, 2014

(30) Foreign Application Priority Data
Sep. 30, 2011   (KR) .................. 10-2011-0099941

(51) Int. Cl.
*G01P 15/12*    (2006.01)
*G01P 15/00*    (2006.01)

(52) U.S. Cl.
CPC ............. *G01P 15/12* (2013.01); *G01P 15/006* (2013.01)

(58) Field of Classification Search
CPC .... G01P 15/12; G01P 15/121; G01P 15/122; G01P 15/123; G01P 15/124; G01P 15/006; G01P 15/008

USPC ............. 73/514.05, 514.06, 514.09, 514.12, 73/514.33
See application file for complete search history.

(56) References Cited

U.S. PATENT DOCUMENTS

| | | | | |
|---|---|---|---|---|
| 3,587,326 A | * | 6/1971 | Riordan et al. | G01P 15/121 73/492 |
| 3,969,944 A | * | 7/1976 | Cirri | G01P 15/12 73/500 |
| 4,676,103 A | * | 6/1987 | Nakajima | G01C 9/06 33/366.19 |

(Continued)

FOREIGN PATENT DOCUMENTS

| | | |
|---|---|---|
| JP | 06-066825 A | 3/1994 |
| KR | 10-0969579 B1 | 7/2010 |

OTHER PUBLICATIONS

International Preliminary Report on Patentability dated Apr. 1, 2014 issued in PCT/KR2012/007746.

(Continued)

*Primary Examiner* — Hezron E Williams
*Assistant Examiner* — Xin Zhong
(74) *Attorney, Agent, or Firm* — Scully Scott Murphy and Presser; Frank Digiglio (57) ABSTRACT

The accelerometer of the present application includes: a main body; a channel positioned in the main body and forming a predetermined movement space; a conductive droplet positioned in the movement space and moving in the movement space according to inertia; a conduction section correspondingly positioned to the movement space and coming in contact with the conductive droplet; and a resistance measurement section connected to the conduction section and measuring the electric resistance of the conduction section.

4 Claims, 6 Drawing Sheets

(56) References Cited

U.S. PATENT DOCUMENTS

| | | | | |
|---|---|---|---|---|
| 5,233,213 A | * | 8/1993 | Marek | G01P 15/0802 257/415 |
| 5,279,040 A | * | 1/1994 | Kippelt | G01C 9/06 33/366.13 |
| 5,533,520 A | * | 7/1996 | Inguaggiato | A61N 1/36542 200/185 |
| 6,276,206 B1 | * | 8/2001 | Reime | G01P 15/006 73/514.09 |

OTHER PUBLICATIONS

International Search Report dated Jan. 30, 2013 issued in PCT/KR2012/007746.

* cited by examiner

ACCELEROMETER

TECHNICAL FIELD

The present disclosure relates to an accelerometer, and more particularly, to an accelerometer including a conductive droplet.

BACKGROUND ART

Accelerometer is a device for measuring acceleration acted on an object.

An accelerometer in the related art may include a proof mass and a beam or spring configured to fix the proof mass to a fixing portion, and such an accelerometer in the prior art senses acceleration acted on an accelerometer based on the movement and transformation of the proof mass due to an inertial force applied to the accelerometer according to an acceleration applied to an object.

However, such an accelerometer in the related art needs a heavier proof mass since a larger inertial force should be induced at the same acceleration to enhance sensitivity to acceleration, and requires a thinner and elongated beam or spring since larger movement and transformation should be induced at the same inertial force. It serves as a factor for weakening the impact resistance of the accelerometer as well as increasing the level of difficulty in fabricating the accelerometer.

Furthermore, according to an accelerometer in the related art, a beam or spring for fixing a proof mass is mechanically moved, and thus mechanical fatigue is piled up on the accelerometer during prolonged use, thereby causing a problem of reducing the reliability and durability of the accelerometer.

DISCLOSURE OF THE INVENTION

On the basis of the foregoing technical background, an aspect of the present disclosure is to provide an accelerometer for enhancing impact resistance as well as enhancing sensitivity to acceleration.

Furthermore, another aspect of the present disclosure is to provide an accelerometer for enhancing reliability and durability.

In order to accomplish the foregoing technical tasks, an accelerometer according to an embodiment of the present disclosure may include a main body, a channel positioned in the main body to form a predetermined movement space, a conductive droplet positioned in the movement space to be moved within the movement space according to an inertial force, a conduction section positioned to correspond to the movement space and brought into contact with the conductive droplet, and a resistance measurement section connected to the conduction section to measure an electrical resistance of the conduction section.

The movement space formed by the channel may have a planarly rectangular shape, and the conductive droplet may be positioned in a central area of the movement space when there is no force applied to the main body.

The conduction section may include a plurality of first sub-conduction sections extended from a first vertex of the rectangular shaped movement space to the central area of the movement space in a separated manner from one another, and a plurality of second sub-conduction sections extended from a second vertex of the rectangular shaped movement space facing the first vertex to the central area of the movement space in a separated manner from one another.

Each of the first sub-conduction section and the second sub-conduction section of the conduction section may become smaller in area as being positioned from each of the first vertex and the second vertex of the movement space to the central area of the movement space.

The movement space formed by the channel may have a planarly circular shape, and the conductive droplet may be positioned in a central area of the movement space when there is no force applied to the main body.

The cross section of the movement space may become larger in width as being positioned at the central area.

The main body may have a planarly rectangular shape, and the conduction section may include a plurality of third sub-conduction sections extended from a first side of the rectangular shaped main body to the central area of the movement space in a separated manner from one another, a plurality of fourth sub-conduction sections extended from a second side of the rectangular shaped main body facing the first side to the central area of the movement space in a separated manner from one another, a plurality of fifth sub-conduction sections extended from a third side of the rectangular shaped main body neighboring the first side to the central area of the movement space in a separated manner from one another, and a plurality of sixth sub-conduction sections extended from a fourth side of the rectangular shaped main body facing the third side to the central area of the movement space in a separated manner from one another.

According to one of several embodiments for solving the foregoing tasks of the present disclosure, it may be possible to enhance impact resistance as well as enhance sensitivity to acceleration in the accelerometer.

Furthermore, it may be possible to enhance reliability and durability in the accelerometer.

MODES FOR CARRYING OUT THE PREFERRED EMBODIMENTS

Hereinafter, several embodiments of the present invention will be described in detail with reference to the accompanying drawings to such an extent that the present invention can be easily embodied by a person having ordinary skill in the art to which the present invention pertains. The present invention may be implemented in various different forms, and therefore, the present invention is not limited to the illustrated embodiments.

In order to clearly describe the present invention, parts not related to the description are omitted, and like reference numerals designate like constituent elements throughout the specification.

Furthermore, according to several embodiments, the same reference numeral will be used for a constituent element having the same configuration to representatively describe a first embodiment, and only different configurations from those of the first embodiment will be described in the other embodiments.

In addition, the size and thickness of each configuration illustrated in the drawings are arbitrarily illustrated for the sake of convenience of explanation, and thus the present disclosure may not be necessarily limited to the illustration.

Throughout the specification, when a portion may "include" a certain constituent element, unless specified otherwise, it may not be construed to exclude another constituent element but may be construed to further include other constituent elements.

Hereinafter, an accelerometer according to a first embodiment of the present disclosure will be described with reference to FIGS. 1 and 2.

Figure 1:
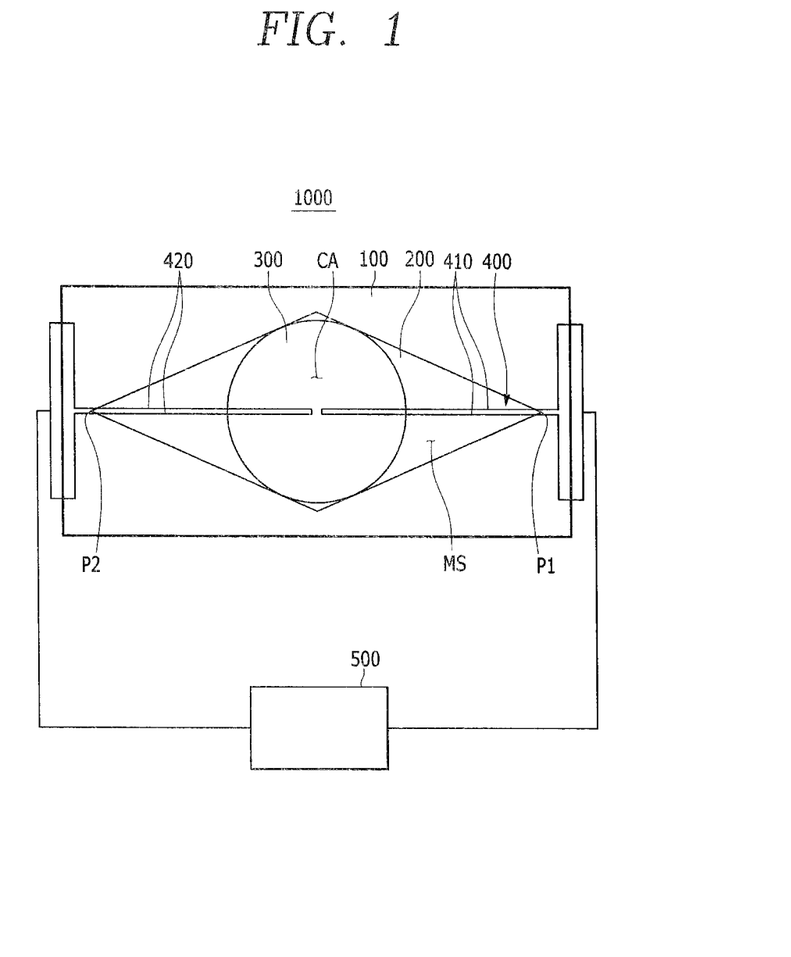
FIG. 1 is a view illustrating an accelerometer according to a first embodiment of the present disclosure.

FIG. 1 is a view illustrating an accelerometer according to a first embodiment of the present disclosure.

As illustrated in FIG. 1, an accelerometer 1000 according to a first embodiment of the present disclosure, as a device attached to a measured body to measure acceleration acted on the measured body, may include a main body 100, a channel 200, a conductive droplet 300, a conduction section 400, and a resistance measurement section 500.

The main body 100 is made of an insulating material. The channel 200 formed in a shape recessed from the surface of the main body 100 is formed on the main body 100. The main body 100 may be formed in a packaging shape to surround the channel 200. The main body 100 may include resin, silicon wafer, glass or the like.

The channel 200 is positioned at the main body 100 to form a predetermined movement space (MG). The movement space (MS) may have a planarly rectangular shape, more particularly, a diamond shape. The channel 200 may be formed on the main body 100 made of an insulating material using a micro electromechanical systems (MEMS) technology such as photolithography process or the like.

The conductive droplet 300 is positioned in the movement space (MS) formed by the channel 200.

The conductive droplet 300 is positioned within the movement space (MS), and moved within the movement space (MS) by an inertial force applied to the main body 100 according to an acceleration applied to the measured body. When there is not inertial force, which is a force applied to the main body 100, the conductive droplet 300 is positioned in the central area (CA). The conductive droplet 300 may have an electrical conductivity, and made of a material maintaining a liquid phase at room temperature. For an example, the conductive droplet 300 may contain mercury or the like.

The conduction section 400 is positioned to correspond to the movement space (MS) and brought into contact with the conductive droplet 300. The conduction section 400 may be patterned on the main body 100 using a micro electromechanical systems (MEMS) technology such as photolithography process or the like. The conduction section 400 is made of a conductive material having a high resistivity such as gold (Au), silver (Ag), copper (Cu), indium tin oxide (ITO), indium zinc oxide (IZO), nichrome, a cobalt-based amorphous material, and the like, and may include a first sub-conduction section 410 and a second sub-conduction section 420.

There are a plurality of first sub-conduction sections 410, and each of the first sub-conduction sections 410 is extended from a first vertex (P1) of the movement space (MS) to the central area (CA) of the movement space (MS) in a separated manner from one another. Each end portion of the first sub-conduction section 410 is interconnected to correspond to the central area (CA).

There are a plurality of second sub-conduction sections 420, and each of the second sub-conduction sections 420 is extended from a second vertex (P2) of the movement space (MS) facing the first vertex (P1) of the movement space (MS) to the central area (CA) of the movement space (MS) in a separated manner from one another. Each end portion of the second sub-conduction section 420 is interconnected to correspond to the central area (CA).

Each of the first sub-conduction section 410 and second sub-conduction section 420 is connected to the resistance measurement section 500.

The resistance measurement section 500 is connected to each of the first sub-conduction section 410 and second sub-conduction section 420 to measure an electrical resistance of each of the first sub-conduction section 410 and second sub-conduction section 420 so as to measure an electrical resistance value change of each of the first sub-conduction section 410 and second sub-conduction section 420. The resistance measurement section 500 may produce an acceleration applied to the measured body using an electrical resistance value change of each of the first sub-conduction section 410 and second sub-conduction section 420.

Hereinafter, the driving principle of an accelerometer 1000 according to a first embodiment of the present disclosure will be described with reference to FIG. 2.

Figure 2:
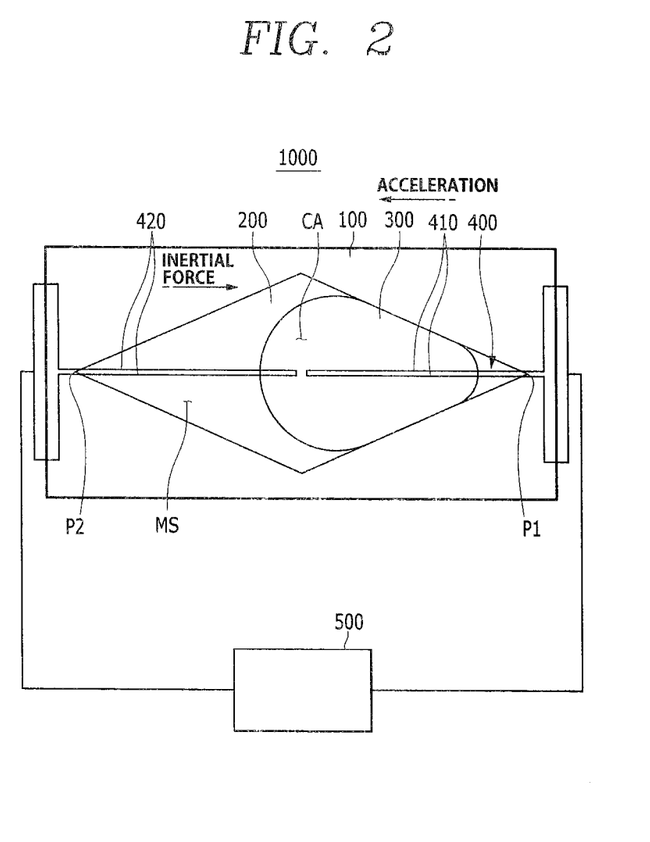
FIG. 2 is a view for explaining an accelerometer according to a first embodiment of the present disclosure.

FIG. 2 is a view for explaining an accelerometer according to a first embodiment of the present disclosure.

First, as illustrated in FIG. 1, the electrical path length of each of the first sub-conduction section 410 and second sub-conduction section 420 is the same in a state that there does not exist an inertial force, which is a force applied to the main body 100, since a measured body attached to the accelerometer 1000 is not moved, and thus the resistance measurement section 500 measures the same electrical resistance value from each of the first sub-conduction section 410 and second sub-conduction section 420.

Next, as illustrated in FIG. 2, when acceleration is applied to the measured body, an inertial force is applied to the main body, and thus the conductive droplet 300 is moved in the direction of an inertial force being applied within the movement space (MS). Due to this, the electrical path of the first sub-conduction section 410 is shortened but the electrical path of the second sub-conduction section 420 is lengthened, and as a result, the resistance measurement section 500 measures a reduced electrical resistance value from the first sub-conduction section 410, and measures an increased electrical resistance value from the second sub-conduction section 420. Using such an electrical resistance value change, the resistance measurement section 500 may produce an acceleration applied to the measured body. In other words, the accelerometer 1000 according to a first embodiment of the present disclosure has the driving principle of producing an acceleration applied to the measured body using an electrical resistance value change of the conduction section 400. Meanwhile, if the acceleration is removed, then the conductive droplet 300 is returned to the central area (CA) of the channel 200 having a larger width due to surface tension.

As described above, the accelerometer 1000 according to a first embodiment of the present disclosure can continuously sense the movement of the conductive droplet 300 by measuring an electrical resistance value change of the conduction section 400, thereby detecting a high-resolution signal. In other words, high-resolution signal detection is allowed to provide the accelerometer 1000 with an enhanced sensitivity to acceleration.

Furthermore, the accelerometer 1000 according to a first embodiment of the present disclosure uses the conductive droplet 300 as a means for measuring an acceleration applied to the measured body, and thus mechanical fatigue is not generated from the accelerometer 1000. In other words, mechanical fatigue is not generated therefrom, thereby providing the accelerometer 1000 with enhanced impact resistance, reliability and durability.

Hereinafter, an accelerometer according to a second embodiment of the present disclosure will be described with reference to FIG. 3.

Figure 3:
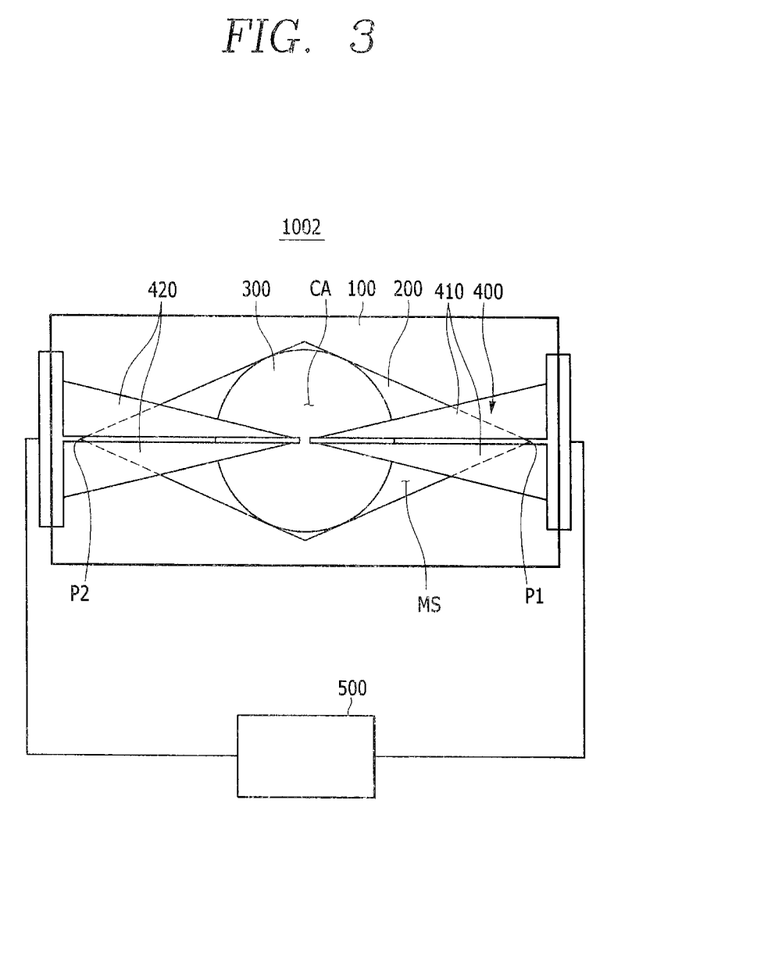
FIG. 3 is a view illustrating an accelerometer according to a second embodiment of the present disclosure.

FIG. 3 is a view illustrating an accelerometer according to a second embodiment of the present disclosure.

As illustrated in FIG. 3, the conduction section 400 of an accelerometer 1002 according to a second embodiment of the present disclosure may include a first sub-conduction section 410 and a second sub-conduction section 420.

The first sub-conduction section 410 is formed to become smaller in area as being positioned from the first vertex (P1) of the movement space (MS) to the central area (CA) of the movement space (MS).

The second sub-conduction section 420 is formed to become smaller in area as being positioned from the second vertex (P2) of the movement space (MS) to the central area (CA) of the movement space (MS).

Substantially, the movement space (MS) formed by the channel 200 is formed in a rectangular shape to generate nonlinearity between an acceleration applied to the measured body and a moving distance of the conductive droplet 300, but each area of the first sub-conduction section 410 and second sub-conduction section 420 is formed to become smaller as being positioned to the central area (CA) of the movement space (MS) to adjust the electrical resistance of each of the first sub-conduction section 410 and second sub-conduction section 420 being varied for each moving distance of the conductive droplet 300, thereby adjusting linearity between an acceleration applied to the measured body and an electrical resistance value measured from each of the first sub-conduction section 410 and second sub-conduction section 420.

In this manner, the accelerometer 1002 according to a second embodiment of the present disclosure may adjust the area of the conduction section 400 to adjust linearity between an acceleration applied to the measured body and an electrical resistance value measured from the conduction section 400, thereby measuring the acceleration applied to the measured body using the electrical resistance value without a post treatment process for linearizing a signal generated from the electrical resistance value measured from the conduction section 400.

Hereinafter, an accelerometer according to a third embodiment of the present disclosure will be described with reference to FIGS. 4 through 6.

Figure 4:
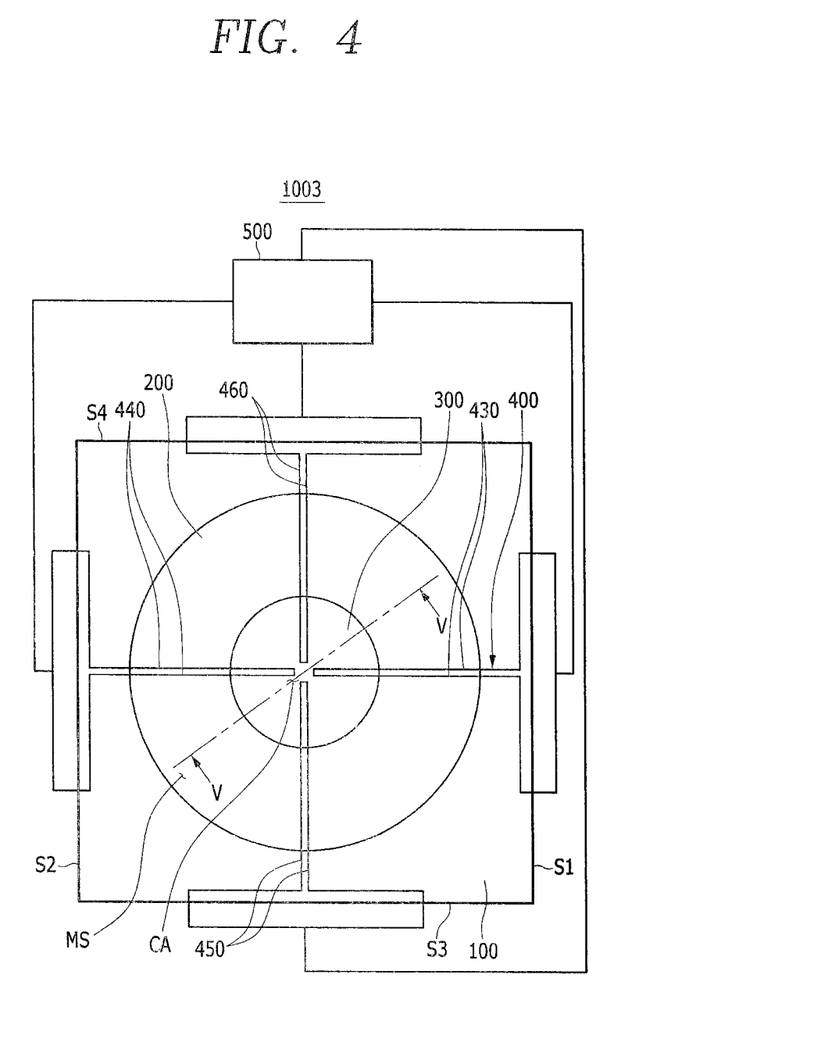
FIG. 4 is a view illustrating an accelerometer according to a third embodiment of the present disclosure.

FIG. 4 is a view illustrating an accelerometer according to a third embodiment of the present disclosure. FIG. 5 is a cross-sectional view taken along line V-V in FIG. 4.

Figure 5:
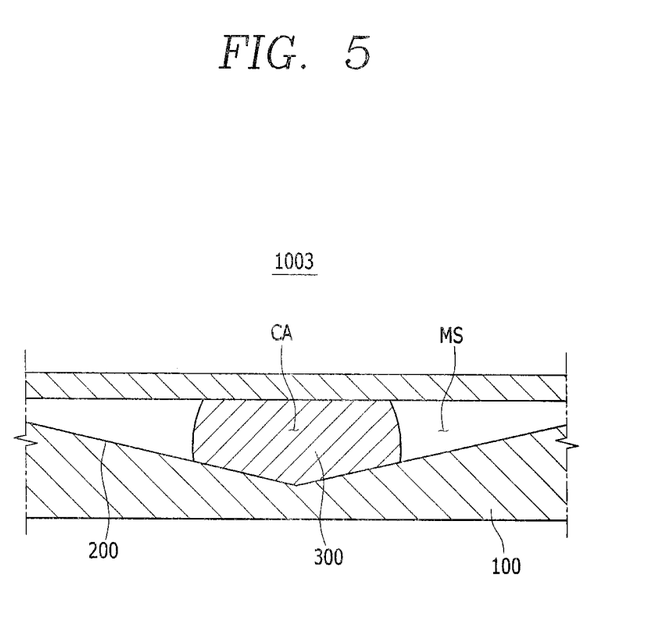
FIG. 5 is a cross-sectional view taken along line V-V in FIG. 4.

As illustrated in FIGS. 4 and 5, the main body 100 of an accelerometer 1003 according to a third embodiment of the present disclosure has a planarly rectangular shape, and the movement space (MS) formed by the channel 200 has a planarly circular shape.

The conductive droplet 300 is positioned within the movement space (MS), and moved within the movement space (MS) by an inertial force applied to the main body 100 according to an acceleration applied to the measured body. When there is not inertial force, which is a force applied to the main body 100, the conductive droplet 300 is positioned in the central area (CA). Specifically, as illustrated in FIG. 5, the cross section of the movement space (MS) formed by the channel 200 becomes larger in width as being positioned to the central area (CA), and thus when there does not exist an inertial force which is a force applied to the main body 100, the conductive droplet 300 is positioned at the central area (CA) of the movement space (MS) due to surface tension.

The conduction section 400 is positioned to correspond to the movement space (MS) formed by the channel 200, and may include a third sub-conduction section 430, a fourth sub-conduction section 440, a fifth sub-conduction section 450, and a sixth sub-conduction section 460.

There are a plurality of third sub-conduction sections 430, and each of the third sub-conduction sections 430 is extended from a first side (S1) of the main body 100 to the central area (CA) of the movement space (MS) in a separated manner from one another. Each end portion of the third sub-conduction sections 430, respectively, is interconnected to correspond to the central area (CA).

There are a plurality of fourth sub-conduction sections 440, and each of the fourth sub-conduction sections 440 is extended from a second side (S2) of the main body 100 facing the first side (S1) of the main body 100 to the central area (CA) of the movement space (MS) in a separated manner from one another. Each end portion of the fourth sub-conduction sections 440, respectively, is interconnected to correspond to the central area (CA).

There are a plurality of fifth sub-conduction sections 450, and each of the fifth sub-conduction sections 450 is extended from a third side (S3) neighboring the first side (S1) and second side (S2) of the main body 100 to the central area (CA) of the movement space (MS) in a separated manner from one another. Each end portion of the fifth sub-conduction sections 450, respectively, is interconnected to correspond to the central area (CA).

There are a plurality of sixth sub-conduction sections 460, and each of the sixth sub-conduction sections 460 is extended from a fourth side (S4) of the main body 100 facing the third side (S3) of the main body 100 to the central area (CA) of the movement space (MS) in a separated manner from one another. Each end portion of the sixth sub-conduction sections 460, respectively, is interconnected to correspond to the central area (CA).

Each of the third sub-conduction section 430, fourth sub-conduction section 440, fifth sub-conduction section 450 and sixth sub-conduction section 460 is connected to the resistance measurement section 500.

The resistance measurement section 500 is connected to the third sub-conduction section 430, fourth sub-conduction section 440, fifth sub-conduction section 450 and sixth sub-conduction section 460, respectively, to measure an electrical resistance of the third sub-conduction section 430, fourth sub-conduction section 440, fifth sub-conduction section 450 and sixth sub-conduction section 460, respectively, so as to measure an electrical resistance value change of the third sub-conduction section 430, fourth sub-conduction section 440, fifth sub-conduction section 450 and sixth sub-conduction section 460, respectively. The resistance measurement section 500 may produce an acceleration applied to a measured body using the electrical resistance value change of the third sub-conduction section 430, fourth sub-conduction section 440, fifth sub-conduction section 450 and sixth sub-conduction section 460, respectively.

Meanwhile, if the acceleration is removed, then the conductive droplet 300 is returned to the central area (CA) of the channel 200 having a larger width due to surface tension.

Hereinafter, the driving principle of an accelerometer 1003 according to a third embodiment of the present invention will be described with reference to FIG. 6.

Figure 6:
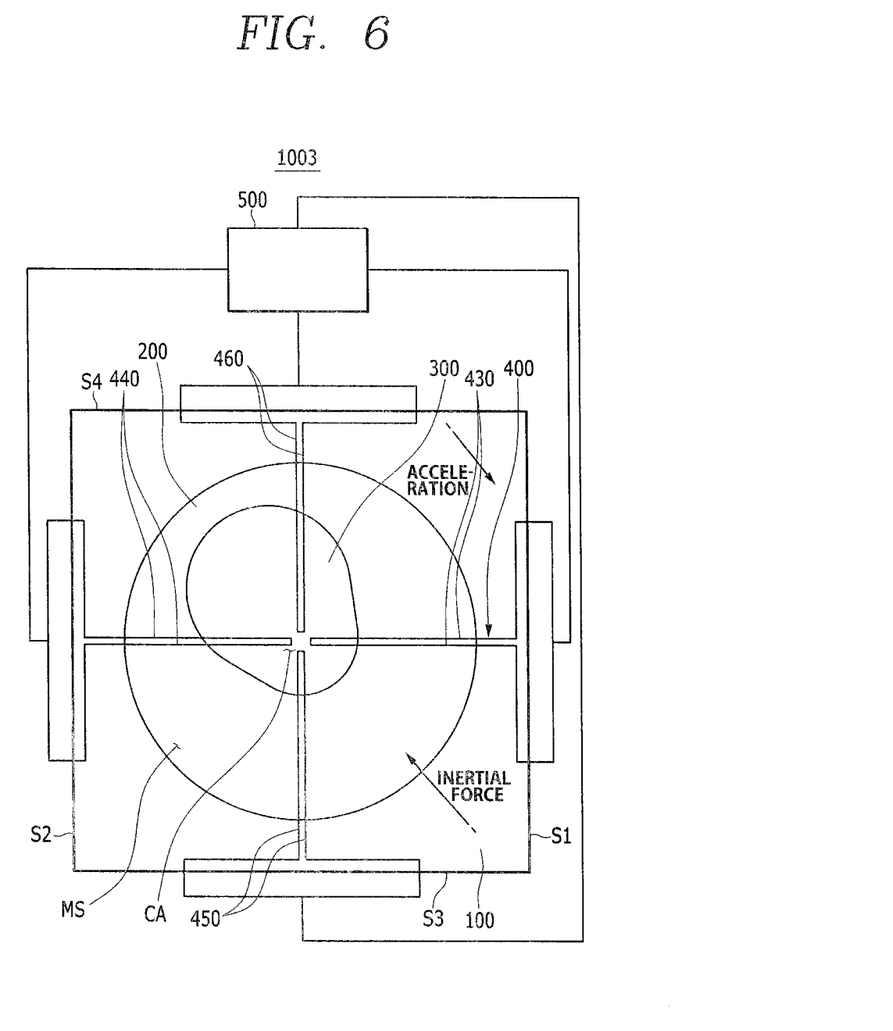
FIG. 6 is a view for explaining an accelerometer according to a third embodiment of the present disclosure.

FIG. 6 is a view for explaining an accelerometer according to a third embodiment of the present disclosure.

First, as illustrated in FIGS. 4 and 5, the electrical path length of the third sub-conduction section 430, fourth sub-conduction section 440, fifth sub-conduction section 450 and sixth sub-conduction section 460, respectively, is the same in a state that there does not exist an inertial force, which is a force applied to the main body 100, since a measured body attached to the accelerometer 1003 is not moved, and thus the resistance measurement section 500 measures the same electrical resistance value from the third sub-conduction section 430, fourth sub-conduction section 440, fifth sub-conduction section 450 and sixth sub-conduction section 460, respectively.

Next, as illustrated in FIG. 6, when acceleration is applied to the measured body, an inertial force is applied to the main body, and thus the conductive droplet 300 is moved in the direction of an inertial force being applied within the movement space (MS). Due to this, one or more electrical paths of the third sub-conduction section 430, fourth sub-conduction section 440, fifth sub-conduction section 450 and sixth sub-conduction section 460 are changed, and as a result, the resistance measurement section 500 measures a changed electrical resistance value from the third sub-conduction section 430, fourth sub-conduction section 440, fifth sub-conduction section 450 and sixth sub-conduction section 460, respectively. Using such an electrical resistance value change, the resistance measurement section 500 may produce an acceleration applied to the measured body. Meanwhile, if the acceleration is removed, then the conductive droplet 300 is returned to the central area (CA) of the channel 200 having a larger width due to surface tension.

As described above, the accelerometer 1003 according to a third embodiment of the present disclosure may measure an electrical resistance value change of the conduction section 400 to continuously sense the movement of the conductive droplet 300 by measuring an electrical resistance value change of the conduction section 400 in all two-dimensional directions, thereby detecting a high-resolution signal in all two-dimensional directions.

Although the present disclosure has been described with reference to the preferred embodiments disclosed in the above, it will be easily understood by those skilled in the art that various modifications and changes can be made without departing from the concept and scope of the claims disclosed below.

The invention claimed is:

1. An accelerometer, comprising
   a main body;
   a channel positioned in the main body to form a predetermined movement space, the movement space having a planarly rectangular shape;
   a conductive droplet positioned in the movement space to be moved within the movement space according to an inertial force;
   a conduction section positioned to correspond to the movement space and brought into contact with the conductive droplet; and
   a resistance measurement section connected to the conduction section to measure an electrical resistance of the conduction section
   wherein the conduction section comprises:
   a first sub-conduction section extended from a first vertex of the rectangular shaped movement space to a central area of the movement space and
   a second sub-conduction section extended from a second vertex of the rectangular shaped movement space facing the first vertex to the central area of the movement space, the second sub-conduction section separated from the first sub-conduction section, wherein each of the first sub-conduction section and the second sub-conduction section of the conduction section becomes smaller in area as being positioned from each of the first vertex and the second vertex of the movement space to the central area of the movement space
   wherein the conductive droplet is positioned in a central area of the movement space when there is no force applied to the main body such that the electrical path length of each of the first sub-conduction section and second sub-conduction section is the same,
   wherein the conductive droplet is moved to one of the first sub-conductive section and second sub-conductive section when there is a force applied to the main body such that the electrical path length of each of the first sub-conduction section and second sub-conduction section is not the same and
   wherein the resistance measurement section produces an acceleration applied to the main body using an electrical resistance value change of each of the first sub-conduction section and second sub-conduction section because of the electrical path length change of the first sub-conduction section and second sub-conduction section.

2. The accelerometer of claim 1, wherein the movement space formed by the channel has a planarly circular shape, and the conductive droplet is positioned in a central area of the movement space when there is no force applied to the main body.

3. The accelerometer of claim 2, wherein a cross section of the movement space becomes larger in width as being positioned at the central area.

4. The accelerometer of claim 1, wherein the main body has a planarly rectangular shape, and
   the conduction section comprises:
   a plurality of third sub-conduction sections extended from a first side of the rectangular shaped main body to a central area of the movement space in a separated manner from one another;
   a plurality of fourth sub-conduction sections extended from a second side of the rectangular shaped main body facing the first side to a central area of the movement space in a separated manner from one another;
   a plurality of fifth sub-conduction sections extended from a third side of the rectangular shaped main body neighboring the first side to a central area of the movement space in a separated manner from one another; and
   a plurality of sixth sub-conduction sections extended from a fourth side of the rectangular shaped main body facing the third side to a central area of the movement space in a separated manner from one another.

* * * * *